United States Patent
Spatafora

[11] Patent Number: 5,896,978
[45] Date of Patent: Apr. 27, 1999

[54] PRODUCT TRANSFER UNIT

[75] Inventor: Mario Spatafora, Bologna, Italy

[73] Assignee: Azionaria Costruzioni Macchine Automatiche A.C.M.A. S.P.A., Bologna, Italy

[21] Appl. No.: 08/774,040

[22] Filed: Dec. 27, 1996

[30] Foreign Application Priority Data

Jan. 9, 1996 [IT] Italy .................................. BO96A0010

[51] Int. Cl.⁶ .................................................. B65G 29/00
[52] U.S. Cl. ..................................... 198/468.8; 198/468.2; 198/811
[58] Field of Search ............................ 198/468.01, 468.2, 198/468.8, 468.6, 470.1, 485.1, 684.1, 811

[56] References Cited

U.S. PATENT DOCUMENTS 4,392,775  7/1983  Ennis et al. .............................. 414/729
5,462,152  10/1995  Wadell ............................... 198/468.8 X

FOREIGN PATENT DOCUMENTS 0181993  5/1986  European Pat. Off. .
2046767  3/1971  France .

*Primary Examiner*—James R. Bidwell
*Attorney, Agent, or Firm*—Ladas & Parry

[57] ABSTRACT

A unit for transferring products, wherein a conveyor belt successively feeds the products along a deformable conveying surface defined by the belt itself and extending through a product pickup station; and a deforming assembly is located beneath the conveying surface at the station, and provides for deforming the conveying surface to form, at the product fed through the station, two transverse dips, which are engaged by respective pickup elements to pick up the product.

4 Claims, 1 Drawing Sheet

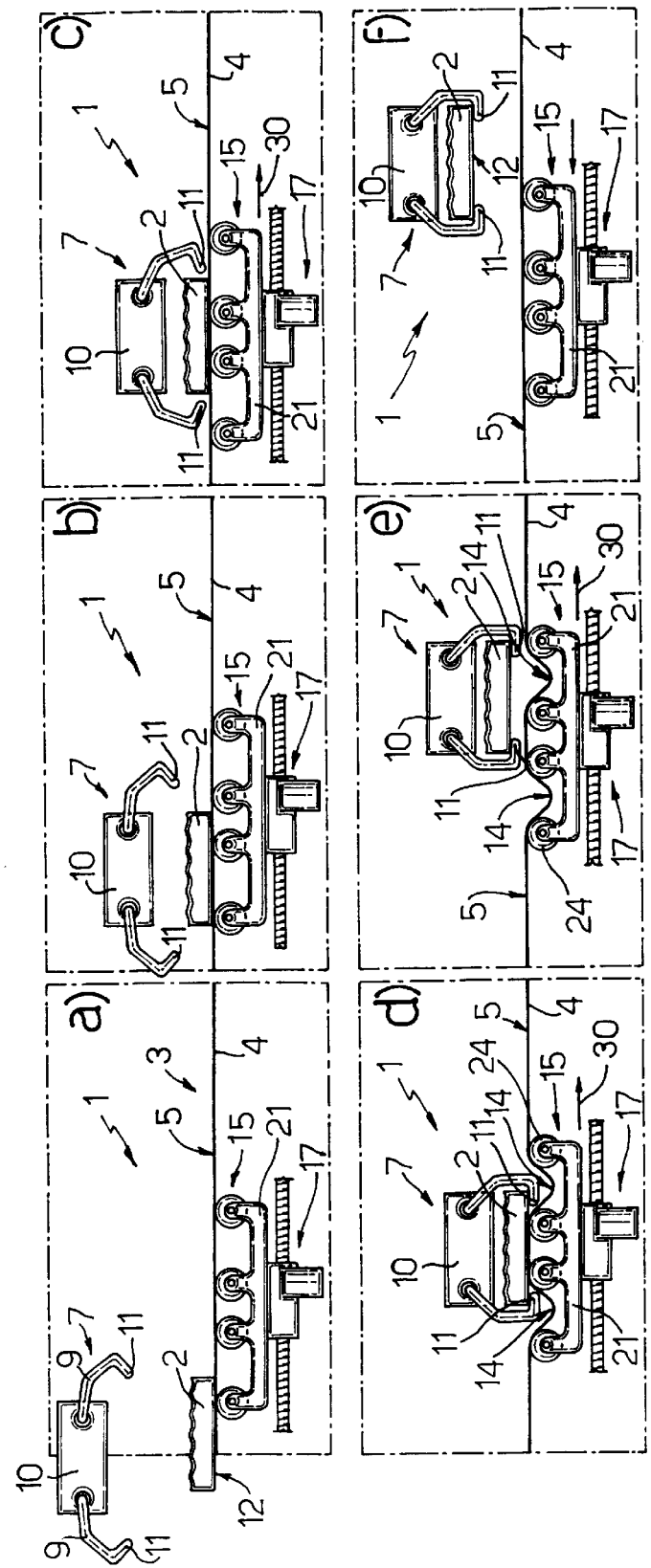
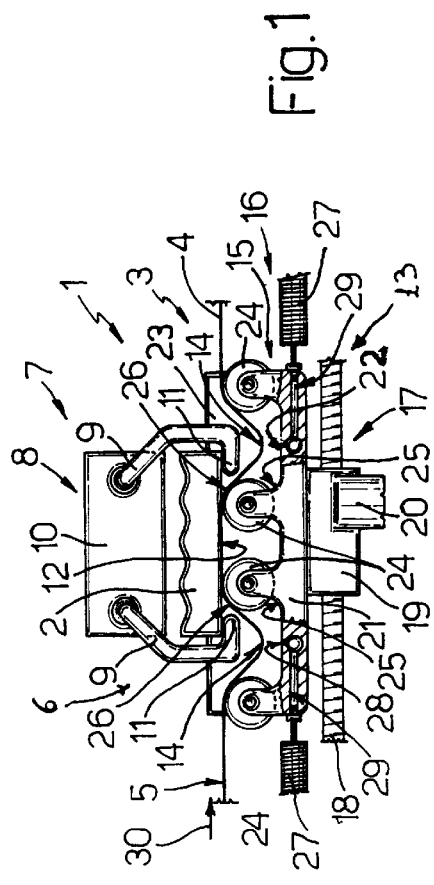
Fig. 2
Fig. 1

PRODUCT TRANSFER UNIT

BACKGROUND OF THE INVENTION

The present invention relates to a product transfer unit.

In particular, the present invention relates to a unit for transferring food products, to which the following description refers purely by way of example.

Transfer units are known, which comprise a conveyor device located at the output of the product manufacturing machine and in turn comprising a conveyor belt for successively feeding the products along a conveying surface extending through a pickup station; and a pickup device located at the pickup station, and for picking up and feeding the products to a packing machine.

The pickup device of known units of the above type normally comprises a number of pickup assemblies for successively picking up the products off the conveyor device and feeding them to the packing machine, and which comprise at least one suction cup, which is brought into contact with the upper surface of the product to grip the product by suction.

Though reliable and straightforward in design, known transfer units of the above type present several drawbacks, particularly when the upper surfaces of the products present undulations or projections, in which case, it is relatively difficult to draw up the product by suction without damaging to some extent the upper surface of the product.

In an attempt to overcome the above drawback, pickup units have recently been introduced wherein the suction cups of the pickup assemblies are replaced by at least two gripping elements between which the product is gripped and clamped laterally. Even this solution, however, presents drawbacks, due to the highly delicate nature of the products, which are nevertheless still damaged superficially by the relatively strong pressure applied by the gripping elements.

SUMMARY OF THE INVENTION

It is an object of the present invention to provide a product transfer unit designed to overcome the aforementioned drawbacks.

According to the present invention, there is provided a unit for transferring products, the unit comprising a conveyor device in turn comprising a conveyor belt for successively feeding the products along a given conveying surface extending through a pickup station; and a pickup device comprising a number of pickup assemblies, each presenting two pickup elements for picking up a respective product fed through the pickup station; the unit being characterized by comprising deforming means located at the pickup station, and for deforming said belt and forming on the belt two transverse dips; said pickup elements presenting respective end teeth, which are inserted inside said transverse dips to contact a bottom surface of a respective product and pick up the product off said conveying surface.

BRIEF DESCRIPTION OF THE DRAWINGS

A non-limiting embodiment of the present invention will be described by way of example with reference to the accompanying drawings, in which:

FIG. 1 shows a partially sectioned view, with parts removed for clarity, of a preferred embodiment of the unit according to the present invention;

FIGS. 2A to 2F show six successive operating positions of the FIG. 1 unit.

DETAILED DESCRIPTION OF THE INVENTION

Number 1 in FIG. 1 indicates a unit for transferring food products 2 from a known machine (not shown) for manufacturing products 2 to a known machine (not shown) for packing products 2.

Unit 1 comprises a conveyor device 3 located at the output of said manufacturing machine, and in turn comprising a conveyor belt 4, which successively feeds products 2 along a deformable conveying surface 5 extending through a product 2 pickup station 6, and is looped about two pulleys (not shown) defining, on belt 4, a conveying branch in turn defining surface 5, and a return branch (not shown).

Unit 1 also comprises a pickup device 7 in turn comprising a number of pickup assemblies 8 (only one shown) movable through station 6 to successively pick up products 2 off conveyor device 3. More specifically, each assembly 8 comprises two shaped pickup elements 9, each of which is fitted at one end to the front of a supporting head 10 and presents a respective end tooth 11 at the free end.

By means of an activating device (not shown), each assembly 8 is movable between an approach position (FIG. 2a) in which respective head 10 is raised in relation to surface 5, and elements 9 are set a given distance apart with respective teeth 11 positioned obliquely in relation to surface 5; and a pickup position (FIG. 2d) in which respective head 10 is positioned directly over surface 5, and elements 9 are set close to each other with respective teeth 11 parallel to surface 5, and, as described more clearly later on, cooperate with the bottom surface 12, over and substantially contacting surface 5, of a respective product 2 to pick up product 2.

Unit 1 also comprises a deforming assembly 13 located beneath surface 5 at pickup station 6, and which provides for forming on belt 4 two transverse dips 14 at either end of a product 2 fed by belt 4 along surface 5, to permit the insertion of teeth 11 beneath surface 5 and surface 12 of product 2.

More specifically deforming assembly 13 comprises a carriage 15; a suction device 16 associated with carriage 15; and an actuating device 17 for moving carriage 15 between a first operating position (FIG. 2a) in which carriage 15 is located upstream from station 6 along surface 5, and a second operating position (FIG. 2f) in which carriage 15 is located downstream from station 6 along surface 5.

Actuating device 17 in turn comprises two guides 18 (only one of which is shown and is threaded externally) extending parallel to each other and to surface 5 along station 6 and beneath surface 5; a nut screw 19 connected to carriage 15 and to threaded guide 18; and a motor 20 for activating nut screw 19 and moving carriage 15 along guides 18 beneath surface 5.

Carriage 15 in turn comprises a bottom wall 21 connected underneath to nut screw 19 and presenting an upper surface 22 facing belt 4; two lateral walls 23 (only one shown) extending transversely from wall 21 on either side of belt 4; and two pairs of rollers 24, which are fitted in rotary manner to walls 23 and crosswise to belt 4, are positioned contacting belt 4 so as to roll in contact with belt 4 and substantially in contact with surface 22, and define, together with walls 23 and surface 22, two respective substantially fluidtight vacuum chambers 25, an opening 26 of each of which directly faces belt 4 and is partially defined by each pair of rollers 24.

Suction device 16 provides for forming a given vacuum inside chambers 25 to draw belt 4 through openings 26 and form dips 14, and comprises two extensible helical conduits 27 located on either side of carriage 15 and connected to wall 21 of carriage 15, and a number of holes 28 formed through surface 22 at chambers 25 and communicating with conduits 27 via a number of further conduits 29 formed inside wall 21.

Operation of unit 1 will be described with reference to FIGS. 2A–2F and as of the instant in which a product 2 is fed by belt 4 on surface 5 through station 6 in a given traveling direction 30; pickup assembly 8 for picking up product 2 off belt 4 is set to said approach position; and carriage 15 is set to the first operating position.

As product 2 is fed through station 6, both assembly 8 and carriage 15 are moved respectively by said activating device and actuating device 17 in direction 30 and at the same speed as product 2, and assembly 8 is gradually brought closer to conveying surface 5.

When assembly 8 is positioned close to product 2, suction device 16 forms said vacuum inside chambers 25 and draws in belt 4 at chambers 25 to form, on belt 4, the two dips 14, which travel together with belt 4 and carriage 15 in direction 30 to enable assembly 8 to be set to the pickup position with respective teeth 11 inside dips 14 and beneath and contacting the bottom surface 12 of product 2.

Once assembly 8 is set to the pickup position with respective product 2 positioned on teeth 11, said activating device moves assembly 8 away from belt 4 to complete the pickup of product 2; device 16 is deactivated to eliminate dips 14; and device 17 inverts carriage 15, by now in the second operating position, to restore it to the first operating position.

I claim:

1. A unit (1) for transferring products (2), the unit (1) comprising a conveyor device (3) in turn comprising a conveyor belt (4) for successively feeding the products (2) along a given conveying surface (5) extending through a pickup station (6); and a pickup device (7) comprising a number of pickup assemblies (8), each presenting two pickup elements (9) for picking up a respective product fed through the pickup station (6); the unit (1) being characterized by comprising deforming means (13) located at the pickup station (6), and for deforming said belt (4) and forming on the belt (4) two transverse dips (14); said pickup elements presenting respective end teeth (11), which are inserted inside said transverse dips (14) to contact a bottom surface (12) of a respective product (2) and pick up the product (2) off said conveying surface (5).

2. A unit as claimed in claim 1, characterized in that said conveying surface (5) is a deformable conveying surface, and is defined by a conveying branch of said belt; said deforming means (13) being located beneath said conveying surface (5), and comprising a suction device (16), which in turn comprises two substantially fluidtight vacuum chambers (25) presenting respective openings (26) directly facing said belt (4), and provides for forming a given vacuum inside the chambers (25) to draw the belt (4) through said openings (26) and so form said dips (14).

3. A unit as claimed in claim 2, characterized in that said deforming means (13) comprise a carriage (15), and actuating means (17) associated with the carriage (15) and for moving the carriage (15) beneath and parallel to said belt (4) and along said pickup station (6).

4. A unit as claimed in claim 3, characterized in that said carriage (15) presents two pairs of rollers (24) positioned contacting said belt (4); the rollers (24) in each pair of rollers (24) partially defining a respective said opening (26).

* * * * *